US012589743B2

(12) United States Patent
    Chiba

(10) Patent No.:  US 12,589,743 B2
(45) Date of Patent:      Mar. 31, 2026

(54) MOVING BODY CONTROL SYSTEM AND MOVING BODY CONTROL METHOD

(71) Applicant: TOYOTA JIDOSHA KABUSHIKI KAISHA, Toyota (JP)

(72) Inventor: Hiroya Chiba, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/201,272

(22) Filed: May 24, 2023

(65) Prior Publication Data

US 2023/0406299 A1      Dec. 21, 2023

(30) Foreign Application Priority Data

Jun. 20, 2022     (JP) ................................. 2022-098892

(51) Int. Cl.
    *B60W 30/10*        (2006.01)
    *B60W 30/06*        (2006.01)
    (Continued)

(52) U.S. Cl.
    CPC ............ *B60W 30/10* (2013.01); *B60W 30/06* (2013.01); *B60W 30/143* (2013.01); (Continued)

(58) Field of Classification Search
    CPC .... B60W 30/10; B60W 30/06; B60W 30/143; B60W 40/068; B60W 40/105; B60W 2420/403; B60W 2540/18; B60W 2552/40; B60W 2555/20; B60W 2710/207; B60W 2720/10; B60W 30/146; B60W 30/18145; B60W 30/18172; B60W 2520/125; B60W 2520/28; G06V 20/588

See application file for complete search history.

(56) References Cited

U.S. PATENT DOCUMENTS 7,526,368 B2 *  4/2009  Endo .................. B62D 15/0285
                                                         701/41
9,725,117 B2 *  8/2017  Hiei ...................... B62D 5/046
                        (Continued)

FOREIGN PATENT DOCUMENTS

JP          H05297939 A  *  4/1992
JP          2011-235816 A     11/2011
                        (Continued)

*Primary Examiner* — Kurt Philip Liethen
(74) *Attorney, Agent, or Firm* — Dinsmore & Shohl LLP

(57)           ABSTRACT

A moving body control system controls travel of a moving body in a predetermined. The moving body control system executes: a position estimation process that estimates a position of the moving body based on a steering angle and a speed of the moving body; a travel control process that controls travel of the moving body so as to follow a target path based on the estimated position of the moving body; a road surface condition acquisition process that acquires road surface condition information indicating slipperiness of a target road surface on the target path at least around the moving body; and a departure suppression process that dynamically changes a control parameter used in the travel control process according to the slipperiness of the target road surface such that departure of the moving body from the target path is suppressed.

10 Claims, 15 Drawing Sheets

(51) Int. Cl.

| | |
|---|---|
| *B60W 30/14* | (2006.01) |
| *B60W 40/068* | (2012.01) |
| *B60W 40/105* | (2012.01) |
| *G06V 20/56* | (2022.01) |

(52) U.S. Cl.
CPC ........ *B60W 40/068* (2013.01); *B60W 40/105* (2013.01); *G06V 20/588* (2022.01); *B60W 2420/403* (2013.01); *B60W 2540/18* (2013.01); *B60W 2552/40* (2020.02); *B60W 2555/20* (2020.02)

(56) References Cited

U.S. PATENT DOCUMENTS

| | | | | |
|---|---|---|---|---|
| 10,239,520 | B2 * | 3/2019 | Tomozawa | B60W 30/06 |
| 10,822,030 | B2 * | 11/2020 | Lee | G05D 1/0088 |
| 10,871,773 | B2 * | 12/2020 | Mizuno | B60W 40/06 |
| 11,144,053 | B2 * | 10/2021 | Urano | B60W 50/0097 |
| 2006/0235590 | A1 * | 10/2006 | Bolourchi | B60W 30/06 |
| | | | | 701/41 |

| | | | | |
|---|---|---|---|---|
| 2019/0220008 | A1 | 7/2019 | Mizuno et al. | |
| 2020/0369267 | A1 * | 11/2020 | Kashiwamura | B60W 30/045 |
| 2021/0293572 | A1 * | 9/2021 | Konrardy | G05D 1/0231 |
| 2021/0316718 | A1 | 10/2021 | Sugano | |
| 2022/0058402 | A1 * | 2/2022 | Hunt | H04N 23/661 |
| 2022/0410875 | A1 * | 12/2022 | Tani | B62D 15/0285 |
| 2023/0311882 | A1 * | 10/2023 | VanBlon | B60L 3/0076 |
| | | | | 701/22 |

FOREIGN PATENT DOCUMENTS

| | | | | | | |
|---|---|---|---|---|---|---|
| JP | 2015110380 | A | * | 6/2015 | ........... | B62D 15/028 |
| JP | 2019-085077 | A | | 6/2019 | | |
| JP | 2019-123321 | A | | 7/2019 | | |
| JP | 2019-175020 | A | | 10/2019 | | |
| JP | 2019182153 | A | * | 10/2019 | | |
| JP | 2020-192938 | A | | 12/2020 | | |
| JP | 2021049867 | A | * | 4/2021 | | |
| JP | 2021138231 | A | * | 9/2021 | ........... | B60W 30/06 |
| JP | 2021-166018 | A | | 10/2021 | | |
| JP | 2022-041437 | A | | 3/2022 | | |

* cited by examiner

| | | ROAD SURFACE CONDITION | |
| --- | --- | --- | --- |
| | | DRY | WET |
| ASPHALT | FRESH PAVEMENT | 0.8 ~ 1.0 | 0.5 ~ 0.8 |
| | ORDINARY PAVEMENT | 0.6 ~ 0.8 | 0.45 ~ 0.7 |
| CONCRETE | FRESH PAVEMENT ORDINARY PAVEMENT | 0.8 ~ 1.0 | 0.5 ~ 0.8 |
| | | 0.6 ~ 0.8 | 0.45 ~ 0.7 |
| GRAVEL | LOW-COST PAVEMENT | 0.55 ~ 0.85 | 0.4 ~ 0.8 |
| | FINE GRAVEL | 0.44 ~ 0.7 | 0.45 ~ 0.75 |

*FIG. 5*

START

S110 — ACQUIRE ROAD SURFACE CONDITION INFORMATION
INDICATING SLIPPERINESS OF TARGET ROAD SURFACE
ON TARGET PATH

S120 — DYNAMICALLY CHANGE CONTROL PARAMETER
ACCORDING TO SLIPPERINESS OF
TARGET ROAD SURFACE SUCH THAT
DEPARTURE FROM TARGET PATH IS SUPPRESSED

S130 — TRAVEL CONTROL PROCESS
SO AS TO FOLLOW TARGET PATH

RETURN

MOVING BODY CONTROL SYSTEM AND MOVING BODY CONTROL METHOD

CROSS-REFERENCE TO RELATED APPLICATION

This application claims priority to Japanese Patent Application No. 2022-098892 filed on Jun. 20, 2022, the entire contents of which are incorporated by reference herein.

BACKGROUND

Technical Field

The present disclosure relates to a technique for controlling travel of a moving body so as to follow a target path in a predetermined area.

Background Art

Patent Literature 1 discloses a vehicle control device that performs lane keeping assist. The vehicle control device determines a travel area in which a vehicle travels, determines a road surface condition in the travel area, and recognizes road surface unevenness in the travel area. Then, the vehicle control device changes the travel area based on the road surface condition and the road surface unevenness in the travel area. In a case where the road surface condition is a wet condition, a variable range of the travel area is set to be narrower or a vehicle speed is lowered, as compared with a case where the road surface condition is a dry condition.

Patent Literature 2, Patent Literature 3, and Patent Literature 4 disclose parking assistance techniques for assisting parking of a vehicle.

List of Related Art

Patent Literature 1: Japanese Laid-Open Patent Application No. JP-2019-175020

Patent Literature 2: Japanese Laid-Open Patent Application No. JP-2019-085077

Patent Literature 3: Japanese Laid-Open Patent Application No. JP-2021-166018

Patent Literature 4: Japanese Laid-Open Patent Application No. JP-2011-235816

SUMMARY

Controlling travel of a moving body so as to follow a target path in a predetermined area is considered. Such a travel control process requires information on a position of the moving body. In some cases, an amount of movement (amount of displacement) is calculated based on a steering angle and a speed of the moving body, and the position of the moving body is estimated based on the amount of movement. Such a technique is also called dead reckoning.

When the moving body travels on a slippery road surface, a probability of occurrence of skid or wheelspin increases. When the skid or the wheelspin occurs, the amount of movement calculated from the steering angle and the speed deviates from an actual amount of movement. This causes decrease in position estimation accuracy. When the position estimation accuracy decreases, accuracy of the travel control process for making the moving body follow the target path also decreases, and thus the moving body may depart from the target path.

An object of the present disclosure is to provide a technique capable of securing accuracy of controlling travel of a moving body so as to follow a target path in a predetermined area.

A first aspect is directed to a moving body control system for controlling travel of a moving body in a predetermined area.

The moving body control system includes one or more processors.

The one or more processors are configured to execute:

a position estimation process that estimates a position of the moving body based on a steering angle and a speed of the moving body;

a travel control process that controls travel of the moving body so as to follow a target path based on the estimated position of the moving body;

a road surface condition acquisition process that acquires road surface condition information indicating slipperiness of a target road surface on the target path at least around the moving body; and a departure suppression process that dynamically changes a control parameter used in the travel control process according to the slipperiness of the target road surface such that departure of the moving body from the target path is suppressed.

A second aspect is directed to a moving body control method for controlling travel of a moving body in a predetermined area.

The moving body control method includes:

a position estimation process that estimates a position of the moving body based on a steering angle and a speed of the moving body;

a travel control process that controls travel of the moving body so as to follow a target path based on the estimated position of the moving body;

a road surface condition acquisition process that acquires road surface condition information indicating slipperiness of a target road surface on the target path at least around the moving body; and a departure suppression process that dynamically changes a control parameter used in the travel control process according to the slipperiness of the target road surface such that departure of the moving body from the target path is suppressed.

According to the present disclosure, the position of the moving body is estimated based on the steering angle and the speed of the moving body, and the travel control process is performed such that the moving body follows the target path based on the estimated position. In the travel control process, the slipperiness of the target road surface on the target path is taken into consideration. More specifically, the control parameter used in the travel control process is dynamically set according to the slipperiness of the target road surface such that departure of the moving body from the target path is suppressed. As a result, the departure of the moving body from the target path is suppressed. That is, the accuracy of the travel control process is secured.

BRIEF DESCRIPTION OF DRAWINGS

FIG. 5 is a diagram showing an example of a relationship between a road surface material, a road surface condition, and a road surface friction coefficient;

EMBODIMENTS

Embodiments of the present disclosure will be described with reference to the accompanying drawings.

Control of a moving body will be considered. Examples of the moving body include a vehicle, a robot, and the like. Examples of the robot include a logistics robot, a delivery robot, a work robot, and the like. The moving body may have an autonomous travel function. The vehicle may be an automated driving vehicle. As an example, a case where the moving body is a vehicle will be considered in the following description. When generalizing, "vehicle" in the following description shall be deemed to be replaced with "moving body."

1. Overview of Vehicle Control System

Figure 1:
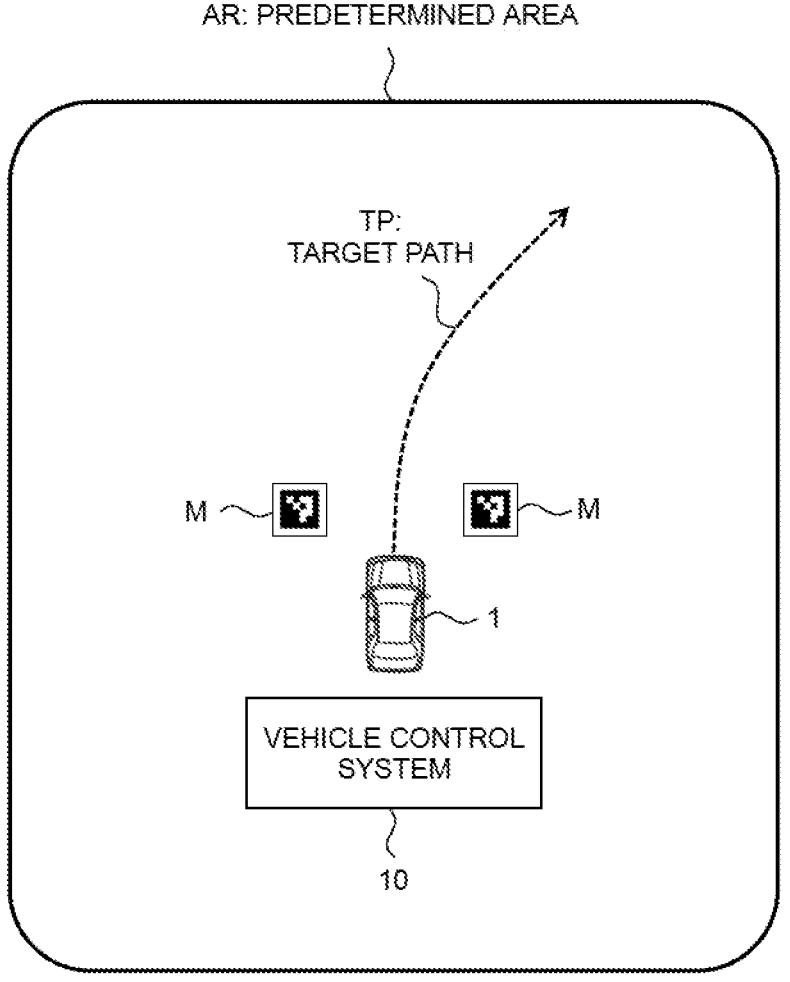
FIG. 1 is a conceptual diagram for explaining an overview of a vehicle control system.

FIG. 1 is a conceptual diagram for explaining an overview of a vehicle control system 10 according to the present embodiment. The vehicle control system 10 controls travel of a vehicle 1. For example, the vehicle control system 10 is installed on the vehicle 1. Alternatively, at least a part of the vehicle control system 10 may be disposed in an external device outside the vehicle 1 and remotely control the vehicle 1.

In particular, the vehicle control system 10 controls the travel of the vehicle 1 so as to follow a target path TP in a predetermined area AR. Examples of the predetermined area AR include a parking lot, one city (e.g., a smart city), and the like. The target path TP is a set of target positions. A target position and a target speed may be associated with each other for each target position. The target path TP may be predetermined. The process of controlling the travel of the vehicle 1 so as to follow the target path TP is hereinafter referred to as a "travel control process."

The travel control process requires information on a current position of the vehicle 1. Therefore, the vehicle control system 10 executes a "position estimation process" that estimates a position of the vehicle 1 in the predetermined area AR. Then, the vehicle control system 10 executes the travel control process based on the estimated position of the vehicle 1 and the target path TP such that the vehicle 1 follows the target path TP.

According to the present embodiment, a steering angle and a vehicle speed (wheel speed) of the vehicle 1 are used for the position estimation process. The steering angle and the vehicle speed are respectively detected by a steering angle sensor and a vehicle speed sensor (wheel speed sensor) mounted on the vehicle 1. The vehicle control system 10 calculates an amount of movement (amount of displacement) of the vehicle 1 based on the steering angle and the vehicle speed of the vehicle 1, and estimates the position of the vehicle 1 based on the amount of movement. Such a technique is also referred to as "dead reckoning."

In order to further improve accuracy of the position estimation, a marker M (landmark) arranged in the predetermined area AR may be used. More specifically, a recognition sensor for recognizing a situation around the vehicle 1 is mounted on the vehicle 1. Typically, the recognition sensor includes a camera that images surroundings of the vehicle 1. The vehicle control system 10 is able to recognize the marker M around the vehicle 1 by using the recognition sensor and grasp a relative positional relationship between the vehicle 1 and the marker M. In addition, the vehicle control system 10 holds map information indicating an installation position of the marker M in the predetermined area AR. The vehicle control system 10 estimates the position of the vehicle 1 in the predetermined area AR by the dead reckoning described above. Further, the vehicle control system 10 corrects the estimated position of the vehicle 1 based on the estimated position of the vehicle 1, the relative positional relationship between the vehicle 1 and the marker M, and the installation position of the marker M in the predetermined area AR. Repeatedly performing the position estimation by the dead reckoning and the position correction using the marker M makes it possible to continuously obtain a highly accurate vehicle position. The highly accurate position estimation process described above is also referred to as a "localization process (localization)."

Figure 2:
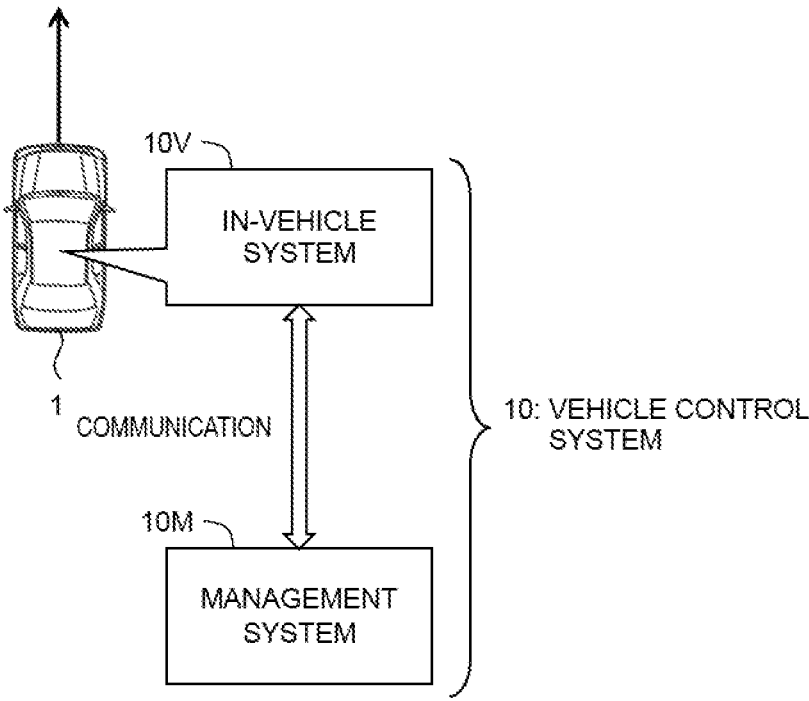
FIG. 2 is a conceptual diagram for explaining an example of a vehicle control system.

FIG. 2 is a conceptual diagram for explaining an example of the vehicle control system 10. In the example shown in FIG. 2, the vehicle control system 10 includes an in-vehicle system 10V (a moving body-side system) installed on the vehicle 1 and a management system 10M outside the vehicle 1. The in-vehicle system 10V is configured to at least control the travel of the vehicle 1. On the other hand, the management system 10M manages the predetermined area AR in which the vehicle 1 travels. The in-vehicle system 10V and the management system 10M communicate with each other and communicate necessary information. The function of the vehicle control system 10 is realized by a cooperation of the in-vehicle system 10V and the management system 10M.

For example, the management system 10M managing the predetermined area AR determines the target path TP of the vehicle 1 in the predetermined area AR. Then, the management system 10M notifies the in-vehicle system 10V of the target path TP determined. The in-vehicle system 10V executes the travel control process such that the vehicle 1 follows the target path TP determined by the management system 10M.

The position estimation process is executed, for example, by the in-vehicle system 10V. As another example, the in-vehicle system 10V may transmit information (the steering angle, the speed, and a result of recognition of the marker M) necessary for the position estimation process to the management system 10M, and the management system 10M may execute the position estimation process and notify the in-vehicle system 10V of the estimated position.

As still another example, the management system 10M may remotely execute the travel control process.

The configuration of the vehicle control system 10 is not limited to that shown in FIG. 2. The entire vehicle control system 10 may be included in the vehicle 1.

2. Travel Control Process in Consideration of Road Surface Condition

Figure 3:
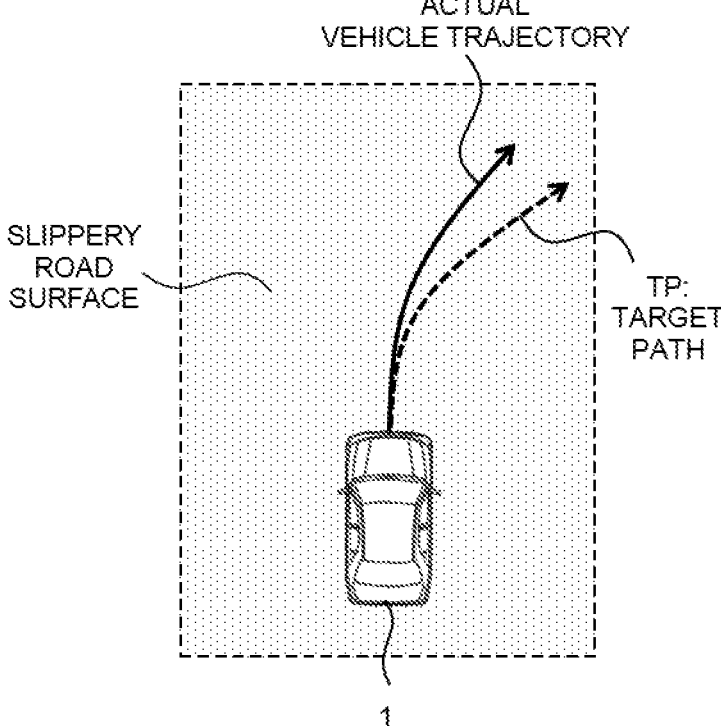
FIG. 3 is a conceptual diagram for explaining an issue.

FIG. 3 shows a situation in which the vehicle 1 travels on a slippery road surface (i.e., a low-μ road). On the slippery road surface, there is a high probability that the vehicle 1 skids or a wheel of the vehicle 1 spins. When the skid or the wheelspin occurs, the amount of movement of the vehicle 1 calculated from the steering angle and the vehicle speed (i.e., the wheel speed) deviates from an actual amount of movement. This causes decrease in position estimation accuracy. When the position estimation accuracy decreases, accuracy of the travel control process for making the vehicle 1 follow the target path TP also decreases, and thus the vehicle 1 may depart from the target path TP. For example, even when it is determined that the estimated position of the vehicle 1 is consistent with the target path TP, an actual position of the vehicle 1 may not be consistent with the target path TP. In other words, the vehicle 1 may be erroneously determined to follow the target path TP, although the actual position of the vehicle 1 departs from the target path TP.

Therefore, the present embodiment proposes a technique capable of securing the accuracy of the travel control process even on a slippery road surface.

2-1. Road Surface Condition Acquisition Process

A road surface on the target path TP in the predetermined area AR is hereinafter referred to as a "target road surface." The vehicle control system 10 acquires road surface condition information 260 indicating "slipperiness (slippiness) S" of the target road surface. The slipperiness S is inversely proportional to a road surface friction coefficient (0. The road surface condition information 260 indicates the slipperiness S of the target road surface at least around the vehicle 1. The road surface condition information 260 may indicate the slipperiness S of the target road surface throughout the entire target path TP. The process of acquiring the road surface condition information 260 is hereinafter referred to as a "road surface condition acquisition process."

Figure 4:
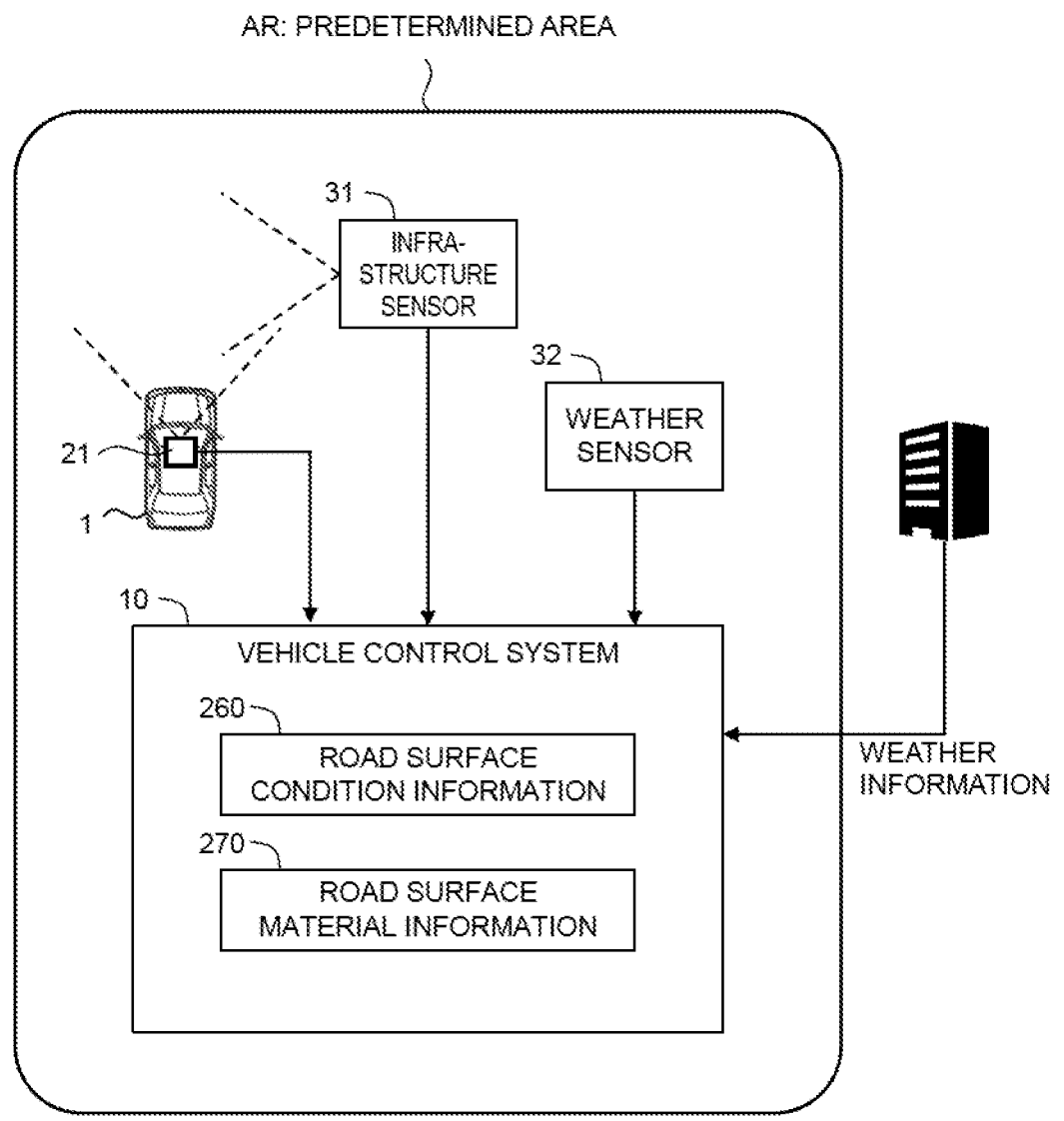
FIG. 4 is a conceptual diagram for explaining various examples of a road surface condition acquisition process.

FIG. 4 is a conceptual diagram for explaining various examples of the road surface condition acquisition process.

2-1-1. First Example

An in-vehicle camera 21 is mounted on the vehicle 1. The in-vehicle camera 21 captures an image of a situation around the vehicle 1. The vehicle control system 10 acquires the image captured by the in-vehicle camera 21. Then, the vehicle control system 10 recognizes a road surface condition of the target road surface around the vehicle 1 (in particular, in front of the vehicle 1) by analyzing the image. For example, the vehicle control system 10 analyzes the image by using image recognition artificial intelligence (AI) generated by machine learning, to recognize the road surface condition of the target road surface.

The road surface condition is classified into at least a "dry condition" and a "wet condition." In the dry condition, the vehicle 1 is relatively hard to skid, and the slipperiness S is set to a relatively low value. On the other hand, in the wet condition, the vehicle 1 is relatively likely to skid, and the slipperiness S is set to a relatively high value. The dry condition may be further classified into a plurality of levels. Similarly, the wet condition may be further classified into a plurality of levels.

As described above, the vehicle control system 10 determines whether the target road surface is in the dry condition or the wet condition based on the image of the target road surface captured by the in-vehicle camera 21. Then, based on whether the target road surface is in the dry condition or the wet condition, the vehicle control system 10 sets the slipperiness S of the target road surface to acquire the road surface condition information 260.

It should be noted that the first example of the road surface condition acquisition process described above may be executed by the in-vehicle system 10V or may be executed by the management system 10M. In the latter case, the management system 10M communicates with the in-vehicle system 10V to acquire the image captured by the in-vehicle camera 21 from the in-vehicle system 10V.

2-1-2. Second Example

An infrastructure camera 31 is installed in the predetermined area AR. The infrastructure camera 31 captures an image of a situation in the predetermined area AR. The vehicle control system 10 acquires the image captured by the infrastructure camera 31. Then, the vehicle control system 10 recognizes the road surface condition of the target road surface at least around the vehicle 1 by analyzing the image. The vehicle control system 10 may recognize the road surface condition of the target road surface throughout the entire target path TP. The others are the same as in the first example described above.

It should be noted that the second example of the road surface condition acquisition process described above is typically executed by the management system 10M.

2-1-3. Third Example

A weather sensor 32 is installed in the predetermined area AR. Examples of the weather sensor 32 include a rainfall amount sensor that detects an amount of rainfall, a humidity sensor that detects humidity, and the like. The vehicle control system 10 determines whether or not it is raining in the predetermined area AR based on a result of detection by the weather sensor 32. Thus, the vehicle control system 10 is able to determine whether the target road surface in the predetermined area AR is in the dry condition or the wet condition. Then, based on whether the target road surface is in the dry condition or the wet condition, the vehicle control system 10 sets the slipperiness S of the target road surface to acquire the road surface condition information 260.

It should be noted that the third example of the road surface condition acquisition process described above is typically executed by the management system 10M.

2-1-4. Fourth Example

The vehicle control system 10 acquires weather information distributed from an information service center. The weather information includes information on a rainfall state and an amount of rainfall. The vehicle control system 10 determines whether the target road surface in the predetermined area AR is in the dry condition or the wet condition based on the weather information. Then, based on whether the target road surface is in the dry condition or the wet condition, the vehicle control system 10 sets the slipperiness S of the target road surface to acquire the road surface condition information 260.

It should be noted that the fourth example of the road surface condition acquisition process described above may be executed by the in-vehicle system 10V or may be executed by the management system 10M.

2-1-5. Fifth Example

In the fifth example, the vehicle control system 10 considers a material of the target road surface in addition to whether the target road surface is in the dry condition or the wet condition. To that end, the vehicle control system 10 holds road surface material information 270 indicating the material of the road surface for each position in the predetermined area AR.

FIG. 5 is a diagram showing an example of a relationship between the road surface material, the road surface condition, and the road surface friction coefficient. The relationship shown in FIG. 5 is described, for example, in http://weekend.nikkouken.com/week47/409/. Examples of the road surface material include asphalt, concrete, and gravel.

The vehicle control system 10 determines whether the target road surface is in the dry condition or the wet condition by the method of any one of the first to fourth examples described above. Further, the vehicle control system 10 acquires the friction coefficient of the target road surface based on whether the target road surface is in the dry condition or the wet condition, the road surface material information 270, and the relationship shown in FIG. 5. Then, based on the friction coefficient of the target road surface, the vehicle control system 10 sets the slipperiness S of the target road surface to acquire the road surface condition information 260. The slipperiness S is inversely proportional to the friction coefficient.

2-2. Departure Suppression Process

The vehicle control system 10 performs the travel control process such that the departure of the vehicle 1 from the target path TP is suppressed in consideration of the slipperiness S of the target road surface indicated by the road surface condition information 260. More specifically, a "control parameter CP" used in the travel control process is dynamically changed according to the slipperiness S of the target road surface. Examples of the control parameter CP include a speed, an upper limit of the speed, a steering speed, an upper limit of the steering speed, and the like. It is also possible to indirectly change the control parameter CP by changing the target path TP used in the travel control process.

The vehicle control system 10 dynamically changes the control parameter CP according to the slipperiness S of the target road surface such that the departure of the vehicle 1 from the target path TP is suppressed. In other words, the vehicle control system 10 sets the control parameter CP according to the slipperiness S of the target road surface such that the departure of the vehicle 1 from the target path TP is suppressed. Such a process is hereinafter referred to as a "departure suppression process."

The departure suppression process may be executed by the in-vehicle system 10V or may be executed by the management system 10M. In the latter case, the management system 10M sets the control parameter CP according to the slipperiness S of the target path TP, and notifies the in-vehicle system 10V of the set control parameter CP. The in-vehicle system 10V executes the travel control process in accordance with the control parameter CP notified from the management system 10M.

Hereinafter, various examples of the departure suppression process will be described.

2-2-1. First Example

Figure 6:
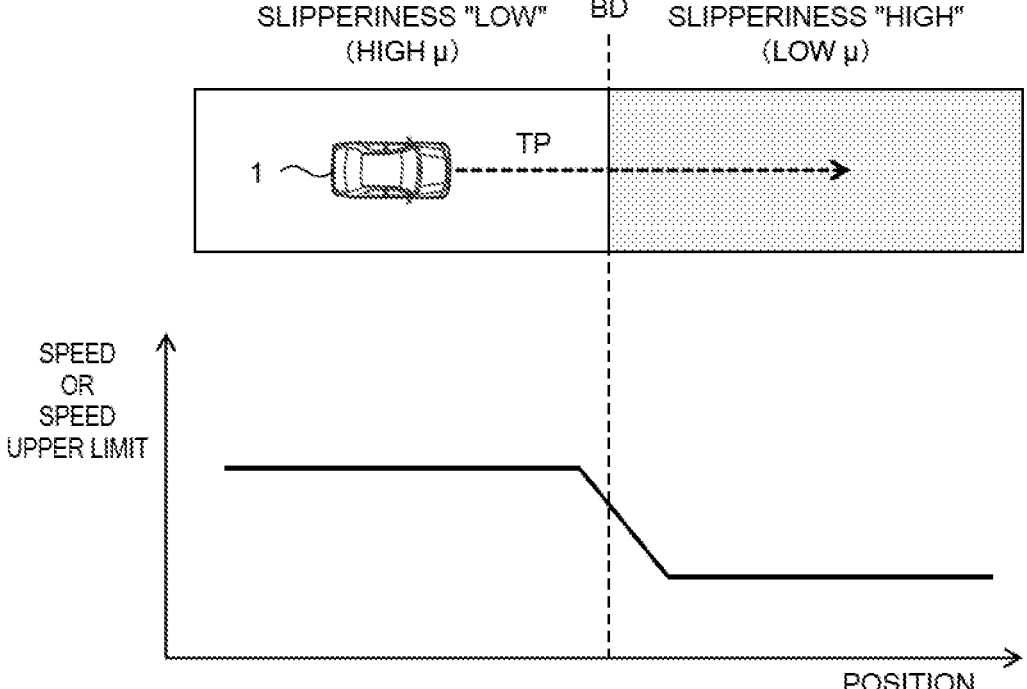
FIG. 6 is a conceptual diagram for explaining a first example of a departure suppression process.

FIG. 6 is a conceptual diagram for explaining a first example of the departure suppression process. In the first example, a speed parameter that is a speed of the vehicle 1 or an upper limit of the speed of the vehicle 1 is considered as the control parameter CP used in the travel control process. The vehicle control system 10 sets the speed parameter at a position with a higher slipperiness S to be lower than the speed parameter at a position with a lower slipperiness S. As a result, the skid and the wheelspin are suppressed at the position where the slipperiness S is high. Therefore, the decrease in the position estimation accuracy is suppressed, and thus the accuracy of the travel control process is secured. As a result, the departure of the vehicle 1 from the target path TP is suppressed.

For example, it is assumed that a default value of a travel speed in the predetermined area AR is determined in advance. For example, it is assumed that the default value of the travel speed is set to 7 km/h for a straight road and 5 km/h for a curve. At a position where the slipperiness S is low, the travel speed is set to the default value. On the other hand, at a position where the slipperiness S is high, the travel speed is set to a value lower than the default value.

2-2-2. Second Example

In the example shown in FIG. 6, there is a boundary BD between a high-μ road with a low slipperiness S and a low-u road with a high slipperiness S. The vehicle 1 enters the low-u road from the high-μ road through the boundary BD. When the vehicle control system 10 determines the road surface condition in front of the vehicle 1 by using the in-vehicle camera 21 (see Section 2-1-1), the presence of the low-u road may be recognized after the vehicle 1 arrives at the vicinity of the boundary BD. In that case, the vehicle control system 10 needs to quickly decrease the speed parameter.

Figure 7:
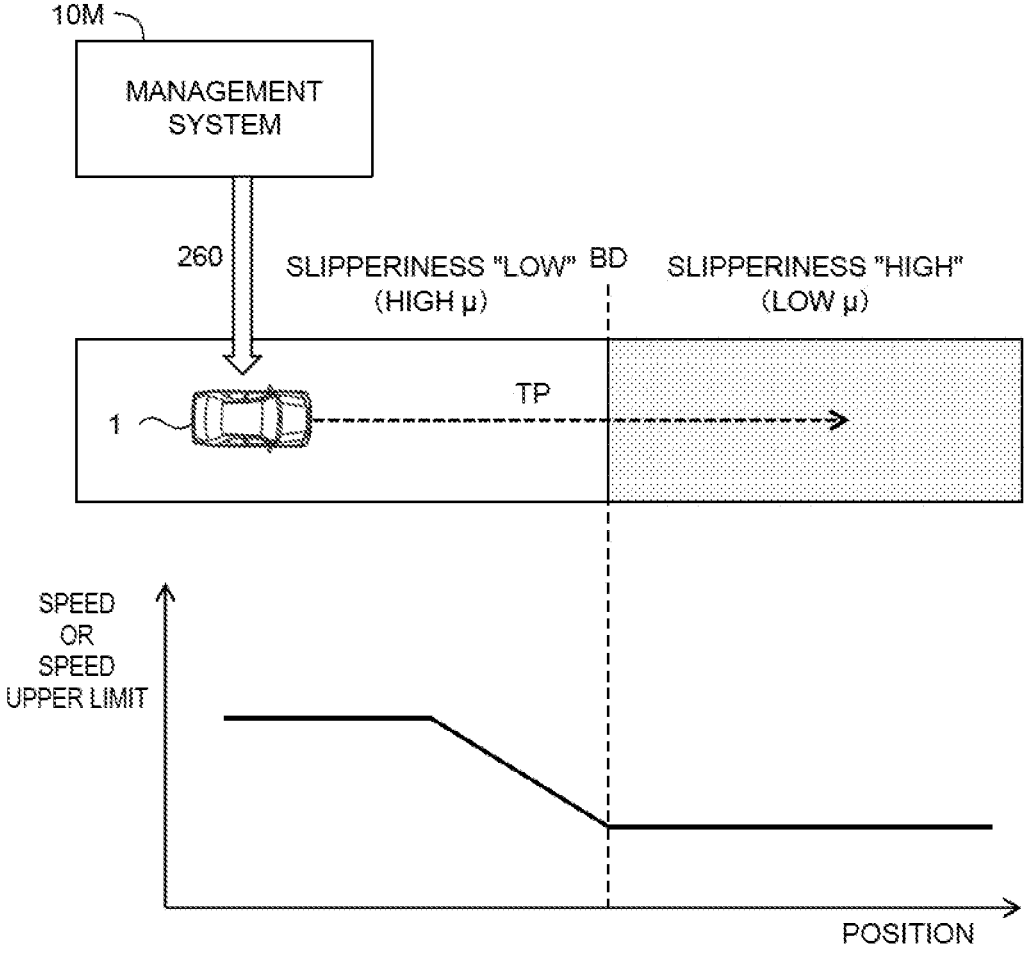
FIG. 7 is a conceptual diagram for explaining a second example of a departure suppression process.

FIG. 7 is a conceptual diagram for explaining a second example of the departure suppression process. In the second example, the management system 10M executes the road surface condition acquisition process to acquire the road surface condition information 260. The management system 10M that manages the predetermined area AR is able to grasp the road surface condition of the entire predetermined area AR. Therefore, the management system 10M is able to acquire the slipperiness S of the target road surface throughout the entire target path TP. That is, the road surface condition information 260 indicating the slipperiness S of the target road surface throughout the entire target path TP is acquired.

The management system 10M notifies the in-vehicle system 10V of such the road surface condition information 260. The in-vehicle system 10V can recognize the presence of the low-μ road ahead at an early stage based on the road surface condition information 260 received from the management system 10M. Therefore, the in-vehicle system 10V is able to execute the departure suppression process to decrease the speed parameter well in advance before the boundary BD (i.e. look-ahead control). In some embodiments, this is selected from a viewpoint of vehicle stability.

Alternatively, the management system 10M may execute the departure suppression process based on the road surface condition information 260 to set a reasonable speed parameter that does not require rapid deceleration. The management system 10M notifies the in-vehicle system 10V of the set speed parameter. The in-vehicle system 10V executes the travel control process in accordance with the speed parameter notified from the management system 10M. Even in this case, the same effect can be obtained.

As described above, according to the second example, the management system 10M managing the predetermined area AR executes the road surface condition acquisition process to acquire the road surface condition information 260. Thus, the road surface condition information 260 indicating the slipperiness S of the target road surface throughout the entire target path TP is acquired. Using such the road surface condition information 260 makes it possible to execute the departure suppression process well in advance. In some embodiments, this is selected preferable from the viewpoint of vehicle stability.

In addition, according to the second example, since the management system 10M executes the road surface condition acquisition process, an effect that processing load of the in-vehicle system 10V is reduced is also obtained.

2-2-3. Third Example

Figure 8:
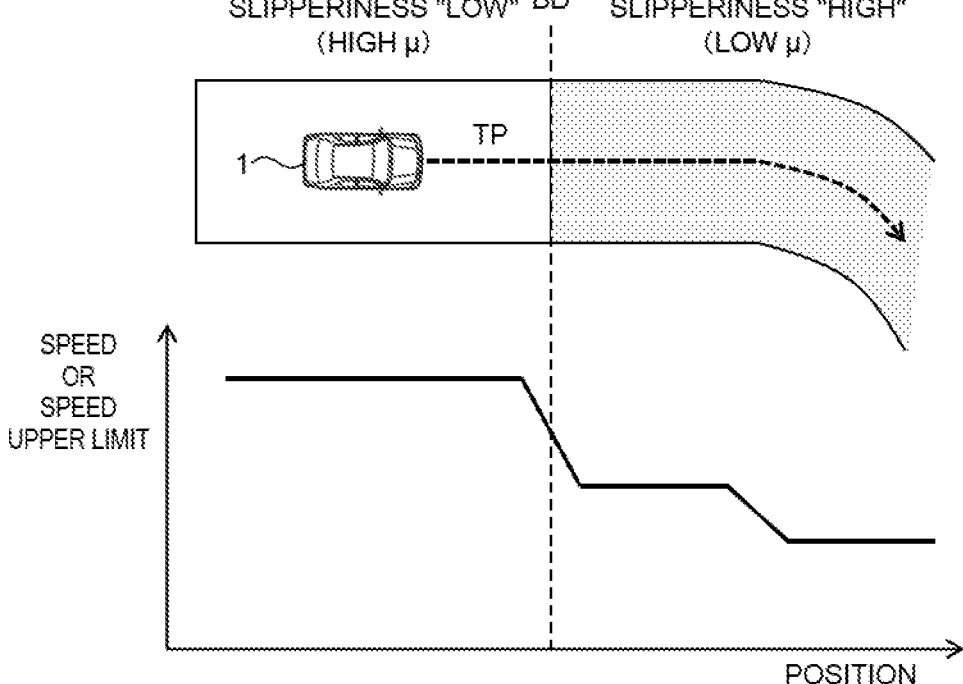
FIG. 8 is a conceptual diagram for explaining a third example of a departure suppression process.

FIG. 8 is a conceptual diagram for explaining a third example of the departure suppression process. The vehicle control system 10 recognizes a turning position at which the vehicle 1 makes a turn. For example, based on the steering angle of the vehicle 1, the vehicle control system 10 recognizes a position at which the steering angle is equal to or greater than a threshold value as the turning position. As another example, based on the target path TP, the vehicle control system 10 recognizes a position at which a curvature of the target path TP is equal to or greater than a threshold value as the turning position. Then, the vehicle control system 10 sets the speed parameter at the turning position to be lower than the speed parameter at a position other than the turning position. As a result, it is possible to more effectively suppress the skid when the vehicle 1 makes a turn.

In the example shown in FIG. 8, the vehicle 1 enters a low-$\mu$ road from a high-$\mu$ road, and the speed parameter is decreased. Thereafter, on the low-$\mu$ road, the vehicle 1 enters a curved road from a straight road. As a result, the speed parameter is further decreased. By setting the speed parameter at the turning position on the low-$\mu$ road to be lower, it is possible to particularly effectively suppress the skid of the vehicle 1.

2-2-4. Fourth Example

Figure 9:
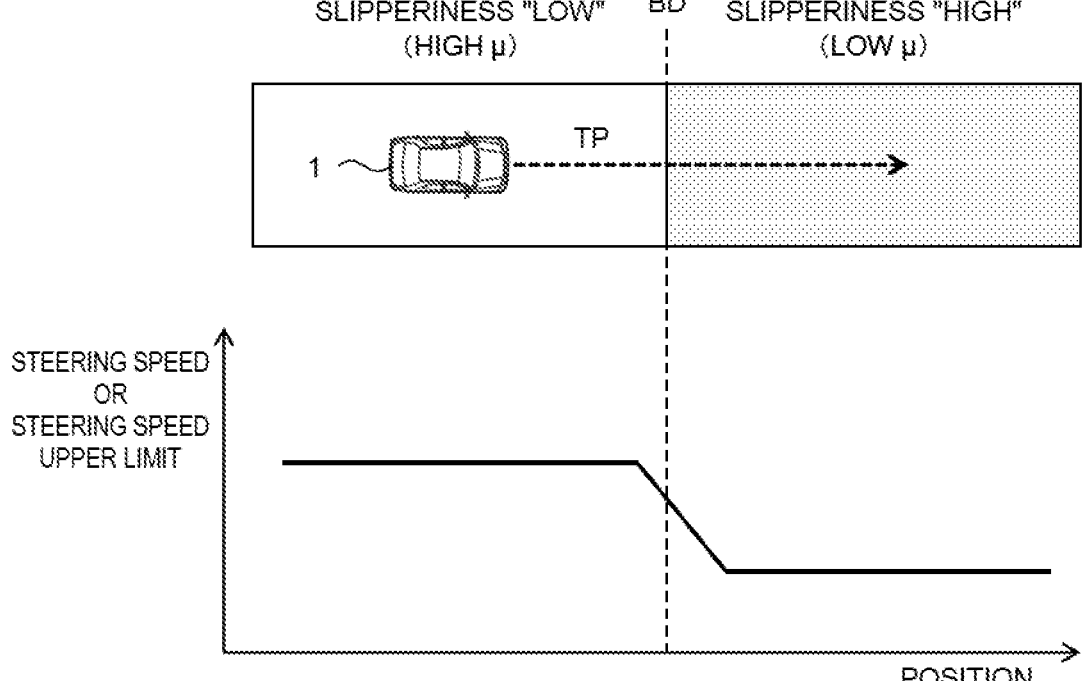
FIG. 9 is a conceptual diagram for explaining a fourth example of a departure suppression process.

FIG. 9 is a conceptual diagram for explaining a fourth example of the departure suppression process. In the fourth example, a steering speed parameter that is a steering speed of the vehicle 1 or an upper limit of the steering speed of the vehicle 1 is considered as the control parameter CP used in the travel control process. The vehicle control system 10 sets the steering speed parameter at a position with a higher slipperiness S to be lower than the steering speed parameter at a position with a lower slipperiness S. As a result, the skid of the vehicle 1 is suppressed at the position where the slipperiness S is high. Therefore, the decrease in the position estimation accuracy is suppressed, and thus the accuracy of the travel control process is secured. As a result, the departure of the vehicle 1 from the target path TP is suppressed.

2-2-5. Fifth Example

Figure 10:
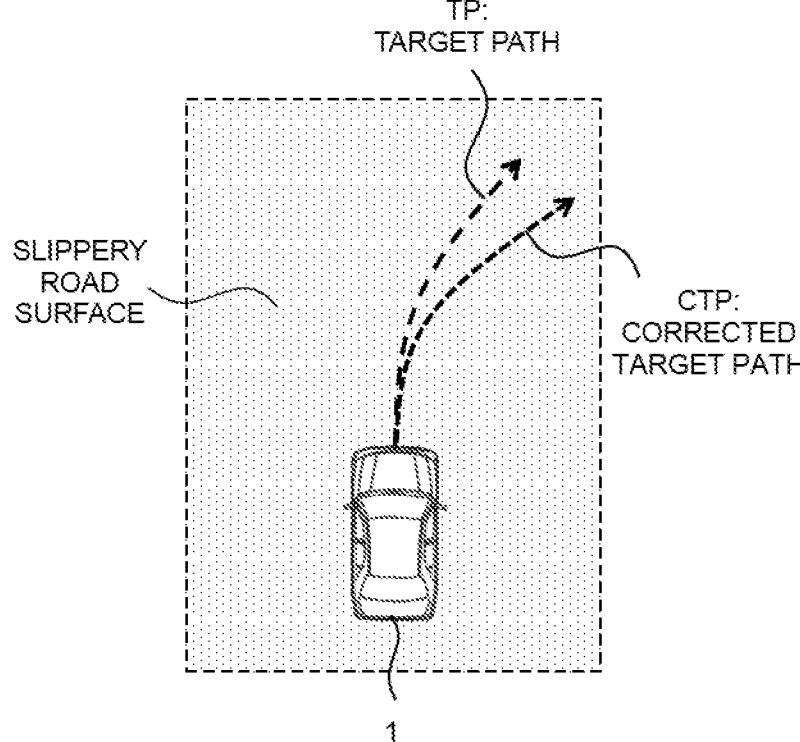
FIG. 10 is a conceptual diagram for explaining a fifth example of a departure suppression process.

FIG. 10 is a conceptual diagram for explaining a fifth example of the departure suppression process. In the fifth example, the target path TP is beforehand corrected to be more inner side of turning on the assumption that skid occurs on a slippery target road surface.

More specifically, as in the case of the third example described above, the vehicle control system 10 recognizes the turning position at which the vehicle 1 makes a turn. Further, the vehicle control system 10 corrects the target path TP at the turning position to a corrected target path CTP. The corrected target path CTP is set to be on more inner side of the turning as the slipperiness S at the turning position becomes higher. Then, the vehicle control system 10 performs the travel control process such that the vehicle 1 follows the corrected target path CTP. Since the target path TP is corrected to the corrected target path CTP on more inner side of the turning, the control parameter CP used in the travel control process is changed indirectly.

As described above, in the fifth example, the target path TP is corrected to be more inner side of the turning on the curved road with a high slipperiness S. Therefore, when skid occurs and a trajectory of the vehicle 1 shifts to the outer side of the turning, the trajectory of the vehicle 1 becomes closer to the original target path TP. That is, the departure of the vehicle 1 from the target path TP is suppressed.

2-2-6. Sixth Example

Two or more of the above-described first to fifth examples of the departure suppression process may be combined as long as there is no contradiction.

2-3. Effects

As described above, according to the present embodiment, the position of the vehicle 1 is estimated based on the steering angle and the vehicle speed of the vehicle 1, and the travel control process is performed such that the vehicle 1 follows the target path TP based on the estimated position. In the travel control process, the slipperiness S of the target road surface on the target path TP is taken into consideration. More specifically, the control parameter CP used in the travel control process is dynamically set according to the slipperiness S of the target road surface such that the departure of the vehicle 1 from the target path TP is suppressed. As a result, the departure of the vehicle 1 from the target path TP is suppressed. That is, the accuracy of the travel control process is secured.

The vehicle control system 10 may be distributed to the in-vehicle system 10V and the management system 10M. In this case, the road surface condition information 260 indicating the slipperiness S of the target road surface on the target path TP may be acquired by the management system 10M. This makes it possible to reduce the processing load of the in-vehicle system 10V.

Moreover, the management system 10M managing the predetermine area AR is able to acquire the road surface condition information 260 indicating the slipperiness S of the target road surface throughout the entire target path TP. By using such the road surface condition information 260, the in-vehicle system 10V can recognize at an early stage the presence of the target road surface with a high slipperiness S. As a result, the in-vehicle system 10V is able to execute the departure suppression process well in advance (i.e. look-ahead control). In some embodiments, this is selected from the viewpoint of vehicle stability.

3. Example of Vehicle Control System

3-1. Configuration Example

Figure 11:
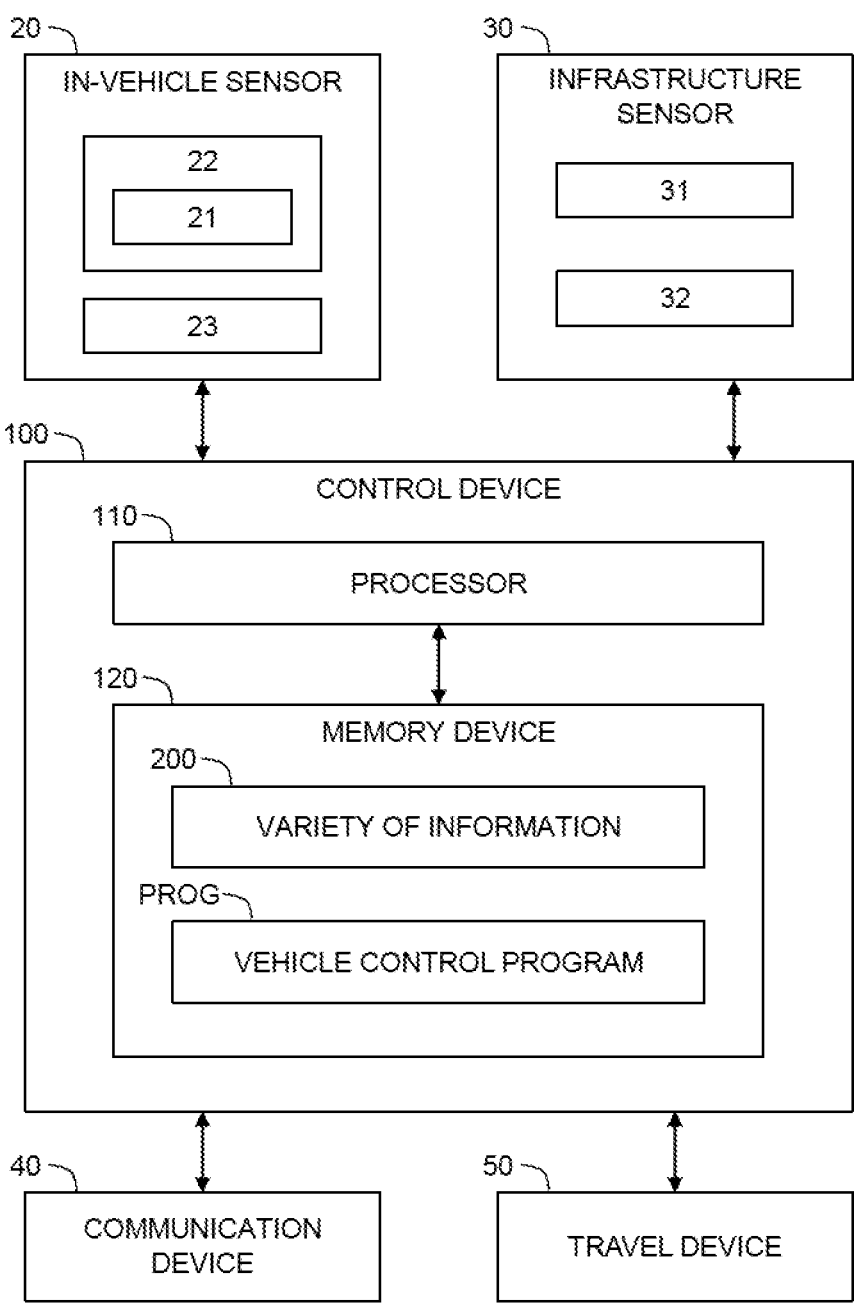
FIG. 11 is a block diagram showing a configuration example of a vehicle control system.

FIG. 11 is a block diagram showing a configuration example of the vehicle control system 10 according to the present embodiment. The vehicle control system 10 includes an in-vehicle sensor 20, an infrastructure sensor 30, a communication device 40, a travel device 50, and a control device 100.

The in-vehicle sensor 20 is mounted on the vehicle 1. The in-vehicle sensor includes a recognition sensor 22 and a vehicle state sensor 23.

The recognition sensor 22 recognizes (detects) a situation around the vehicle 1. The recognition sensor 22 includes the in-vehicle camera 21 that captures an image of a situation around the vehicle 1. The recognition sensor 22 may further include a laser imaging detection and ranging (LIDAR), a radar, a sonar, or the like.

The vehicle state sensor 23 detects a state of the vehicle 1. Examples of the vehicle state sensor 23 include a vehicle speed sensor (a wheel speed sensor), a steering angle sensor, a yaw rate sensor, a lateral acceleration sensor, and the like.

The infrastructure sensor 30 is installed in the predetermined area AR. For example, the infrastructure sensor 30 includes the infrastructure camera 31 that captures an image of a situation of the predetermined area AR. The infrastructure sensor 30 may include the weather sensor 32. Examples of the weather sensor 32 include a rainfall amount sensor that detects an amount of rainfall, a humidity sensor that detects humidity, and the like.

The communication device 40 communicates with the outside of the vehicle control system 10. For example, the communication device 40 communicates with an information service center that distributes the weather information (see FIG. 4).

The travel device 50 is mounted on the vehicle 1. The travel device 50 includes a steering device, a driving device, and a braking device. The steering device steers a wheel of the vehicle 1. For example, the steering device includes an electric power steering (EPS) device. The driving device is a power source that generates a driving force. Examples of the driving device include an engine, an electric motor, an in-wheel motor, and the like. The braking device generates a braking force.

The control device 100 (controller) controls the vehicle 1. The control device 100 includes one or more processors 110 (hereinafter, simply referred to as a processor 110) and one or more memory devices 120 (hereinafter, simply referred to as a memory device 120). The processor 110 executes a variety of processing. For example, the processor 110 includes a central processing unit (CPU). The memory device 120 stores a variety of information 200. Examples of the memory device 120 include a volatile memory, a non-volatile memory, a hard disk drive (HDD), a solid state drive (SSD), and the like. The control device 100 may be distributed to the in-vehicle system 10V and the management system 10M.

A vehicle control program PROG is a computer program for controlling the vehicle 1. A variety of processing by the control device 100 may be implemented by the processor 110 executing the vehicle control program PROG. The vehicle control program PROG is stored in the memory device 120. Alternatively, the vehicle control program PROG may be recorded on a non-transitory computer-readable recording medium.

3-2. Variety of Information

Figure 12:
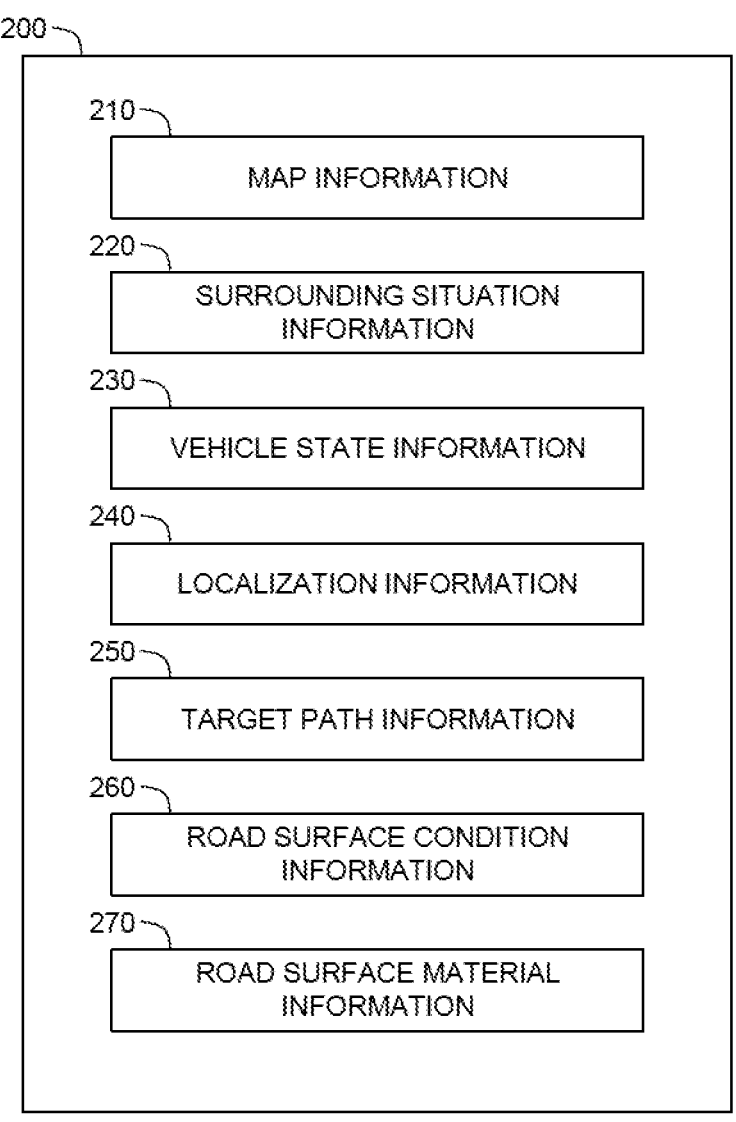
FIG. 12 is a block diagram showing an example of a variety of information.

FIG. 12 is a block diagram showing an example of the variety of information 200 stored in the memory device 120. The variety of information 200 include map information 210, surrounding situation information 220, vehicle state information 230, localization information 240, target path information 250, the road surface condition information 260, the road surface material information 270, and the like.

The map information 210 is map information of the predetermined area AR. The map information 210 indicates positions of roads and structures in the predetermined area AR. Moreover, the map information 210 indicates a position of each marker M installed in the predetermined area AR.

The surrounding situation information 220 is information indicating a situation around the vehicle 1 and a situation of the predetermined area AR. The surrounding situation information 220 includes a result of recognition by the recognition sensor 22 and a result of detection by the infrastructure sensor 30. For example, the surrounding situation information 220 includes the images captured by the in-vehicle camera 21 and the infrastructure camera 31. As another example, the surrounding situation information 220 may include a result of detection by the weather sensor 32.

In addition, the surrounding situation information 220 includes object information regarding an object around the vehicle 1. Examples of the object include a pedestrian, another vehicle, a white line, the marker M, a structure, and the like. The object information indicates a relative position and a relative speed of the object with respect to the vehicle 1. For example, analyzing the image captured by the in-vehicle camera 21 makes it possible to identify an object and calculate the relative position of the object. For example, the control device 100 identifies an object in the image by using an image recognition AI generated by machine learning. It is also possible to identify an object and acquire the relative position and the relative speed of the object, based on point cloud information acquired by the LIDAR mounted on the vehicle 1.

The vehicle state information 230 is information indicating the state of the vehicle 1 and indicates a result of detection by the vehicle state sensor 23. Examples of the state of the vehicle 1 include the vehicle speed (the wheel speed), the steering angle, a yaw rate, a lateral acceleration, and the like.

The localization information 240 indicates the position of the vehicle 1 acquired by the localization process. More specifically, the control device 100 calculates an amount of movement (amount of displacement) of the vehicle 1 based on the vehicle state information 230 (specifically, the vehicle speed, the steering angle), and estimates the position of the vehicle 1 based on the amount of movement. Moreover, the control device 100 acquires the position of each marker M in the predetermined area AR from the map information 210, and acquires the relative position of the marker M with respect to the vehicle 1 based on the surrounding situation information 220. Then, the control device 100 corrects the estimated position of the vehicle 1 based on the estimated position of the vehicle 1, the relative positional relationship between the vehicle 1 and the marker M, and the installation position of the marker M in the predetermined area AR.

Repeatedly performing the position estimation and the position correction makes it possible to continuously obtain a highly accurate vehicle position.

The target path information 250 indicates the target path TP of the vehicle 1 in the predetermined area AR.

The road surface condition information 260 indicates the slipperiness S of the target road surface on the target path TP. Various examples of the method of acquiring the road surface condition information 260 are as described in the above Section 2-1. The road surface condition information 260 indicates the slipperiness S of the target road surface at least around the vehicle 1. The road surface condition information 260 may indicate the slipperiness S of the target road surface over the entire target path TP.

The road surface material information 270 indicates the material of the road surface for each position in the predetermined area AR. The road surface material information 270 is generated in advance.

3-3. Travel Control Process

The control device 100 executes the travel control process that controls travel of the vehicle 1 regardless of a driving operation by a driver. The control device 100 executes the travel control process by controlling the travel device 50 (i.e., the steering device, the driving device, and the braking device).

In particular, the control device 100 executes the travel control process such that the vehicle 1 follows the target path TP. To this end, the control device 100 calculates a difference (for example, a lateral difference, a yaw angle difference) between the position of the vehicle 1 and the target path TP. The position of the vehicle 1 is obtained from the localization information 240. The target path TP is obtained from the target path information 250. Then, the control device 100 controls the travel of the vehicle 1 such that the difference between the position of the vehicle 1 and the target path TP decreases.

3-4. Departure Suppression Process

Figure 13:
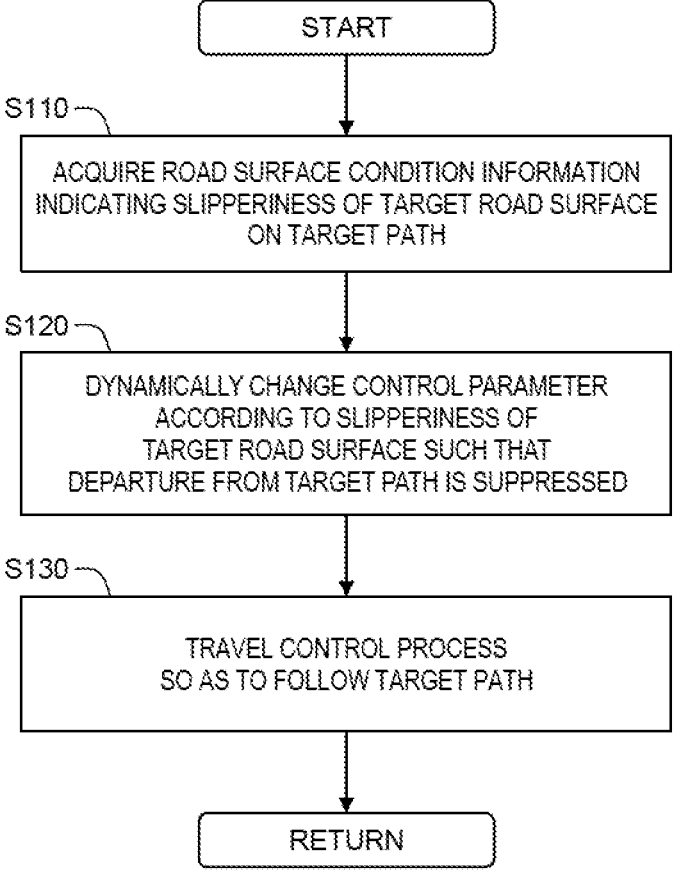
FIG. 13 is a flowchart showing processing related to a departure suppression process performed by a vehicle control system.

FIG. 13 is a flowchart showing processing related to the departure suppression process.

In Step S110, the control device 100 acquires the road surface condition information 260 indicating the slipperiness S of the target road surface on the target path TP (see Section 2-1).

In Step S120, the control device 100 performs the departure suppression process in consideration of the slipperiness S of the target road surface indicated by the road surface condition information 260 (see Section 2-2). More specifically, the control device 100 dynamically changes the control parameter CP used in the travel control process according to the slipperiness S of the target road surface such that the departure of the vehicle 1 from the target path TP is suppressed. In other words, the control device 100 sets the control parameter CP according to the slipperiness S of the target road surface such that the departure of the vehicle 1 from the target path TP is suppressed.

In Step S130, the control device 100 performs the travel control process based on the control parameter CP such that the vehicle 1 follows the target path TP.

4. Automated Valet Parking

Figure 14:
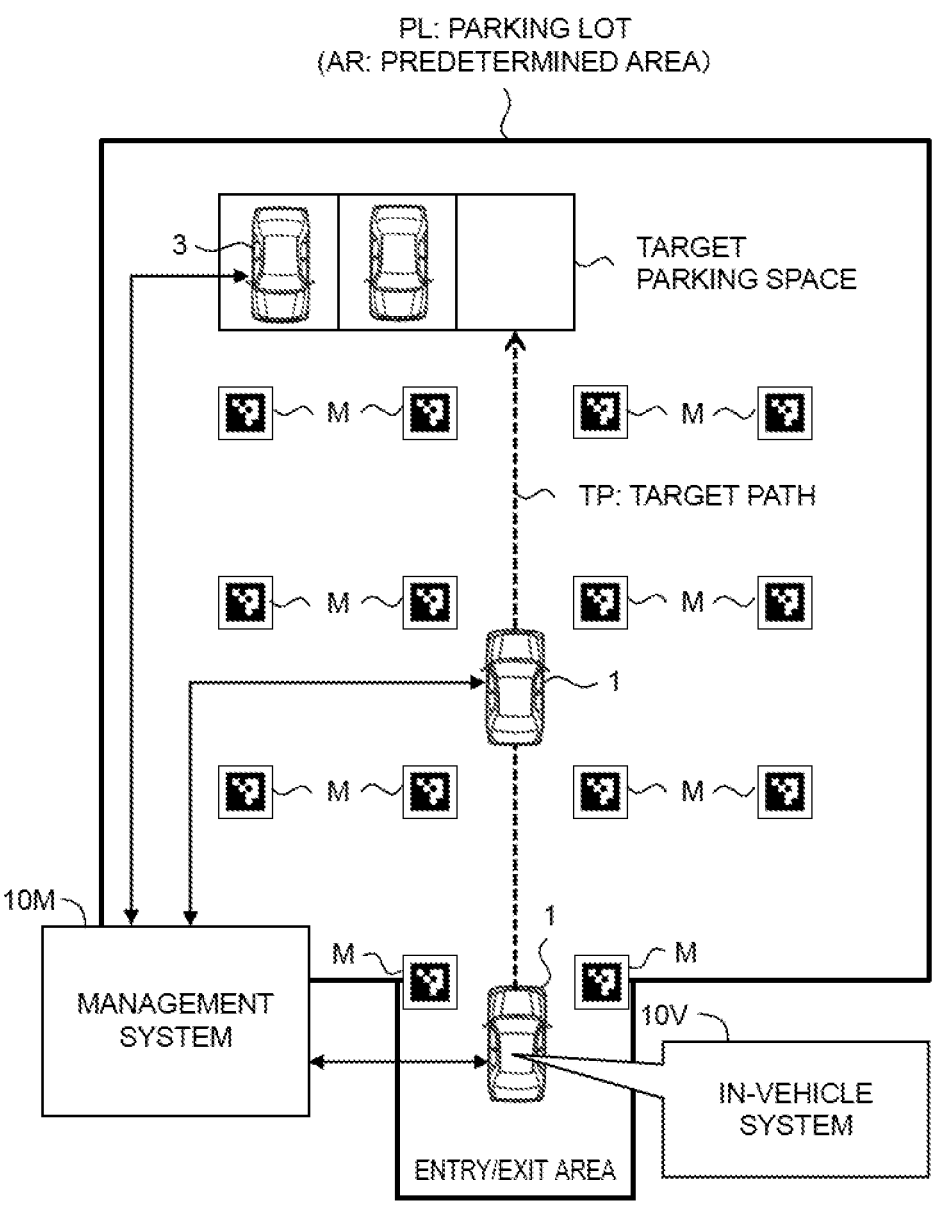
FIG. 14 is a conceptual diagram for explaining an overview of automated valet parking.

FIG. 14 is a conceptual diagram for explaining an overview of automated valet parking (AVP). In the example shown in FIG. 14, the predetermined area AR is a parking lot PL. A plurality of markers M are arranged in the parking lot PL. The vehicle 1 is an AVP vehicle that supports the automated valet parking in the parking lot PL, and can automatically travel at least in the parking lot PL.

The vehicle control system 10 controls the automated travel of vehicle 1 in the parking lot PL. More specifically, the vehicle control system 10 includes the in-vehicle system 10V installed on the vehicle 1 and the management system 10M outside the vehicle 1.

The management system 10M manages the automated valet parking in the parking lot PL. The management system 10M is capable of communicating with each vehicle (the vehicle 1 and a parked vehicle 3) in the parking lot PL. For example, the management system 10M may issue an entry instruction or an exit instruction to the in-vehicle system 10V. The management system 10M may provide the map information 210 of the parking lot PL to the in-vehicle system 10V. The management system 10M may allocate a parking space to the vehicle 1. The management system 10M may generate a target path TP from an entry area to the allocated parking space and provide information on the target path TP to the in-vehicle system 10V. The management system 10M may grasp a position of each vehicle (the vehicle 1 and the parked vehicle 3) in the parking lot PL. The management system 10M may remotely operate each vehicle (the vehicle 1 and the parked vehicle 3) in the parking lot PL.

The in-vehicle system 10V controls the automated travel of the vehicle 1 in the parking lot PL. For example, the in-vehicle system 10V recognizes the marker M around the vehicle 1 by using the in-vehicle camera 21. Then, the in-vehicle system 10V performs the localization process based on a result of recognition of the marker M to estimate the position of the vehicle 1 in the parking lot PL with high accuracy. Further, the in-vehicle system 10V receives the information on the target path TP from the management system 10M. Then, the in-vehicle system 10V controls the travel of the vehicle 1 so as to follow the target path TP based on the position of the vehicle 1 and the target path TP. Thus, the vehicle 1 is able to automatically move from the entry area to the target parking space.

Figure 15:
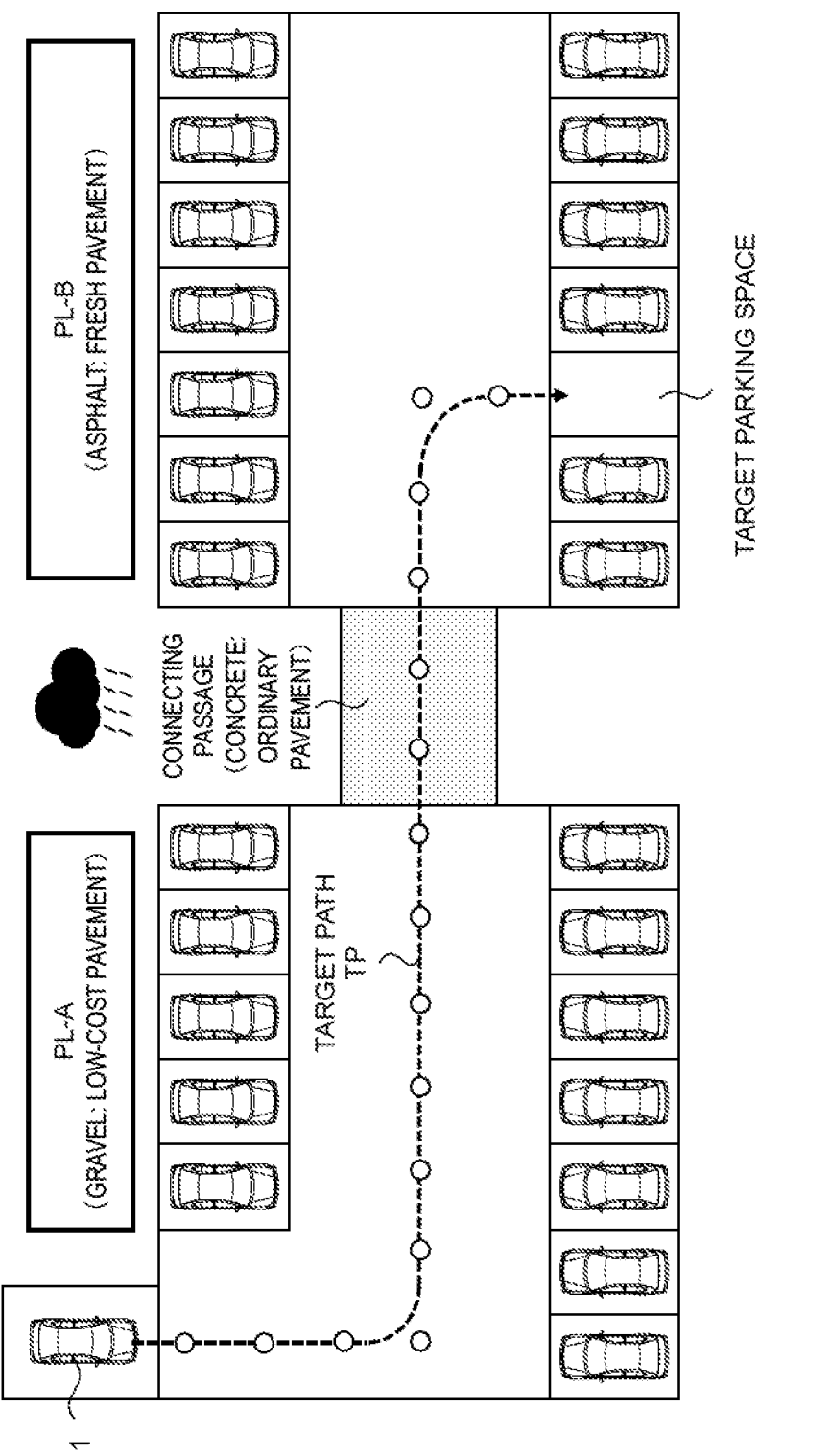
FIG. 15 is a conceptual diagram for explaining an example of a departure suppression process in automated valet parking.

FIG. 15 is a conceptual diagram for explaining an example of the departure suppression process in the automated valet parking. The parking lot PL includes a parking area PL-A, a parking area PL-B, and a connecting passage that connects between the parking area PL-A and the parking area PL-B. The road surface material of the parking area PL-A is gravel (low-cost pavement). The road surface material of the parking area PL-B is asphalt (fresh pavement). The road surface material of the connecting passage is concrete (ordinary pavement). The friction coefficient of each road surface material is as shown in FIG. 5.

As an example, a case where the vehicle 1 automatically travels from the entry area to the target parking space in the parking area PL-B via the parking area PL-A and the connecting passage will be considered. The vehicle control system 10 appropriately performs the departure suppression process in consideration of the slipperiness S of the target road surface on the target path TP.

In particular, the management system 10M managing the parking lot PL grasps the road surface material of the entire parking lot PL, and is able to acquire the road surface condition information 260 indicating the slipperiness S of the target road surface throughout the entire target path TP. By using such the road surface condition information 260, the in-vehicle system 10V is able to recognize presence of the target road surface with a high slipperiness S at an early stage. As a result, the in-vehicle system 10V is able to execute the departure prevention process well in advance (i.e., look-ahead control).

When roofs are installed over the parking areas PL-A and PL-B and no roof is installed over the connecting passage, the following is performed. At the time of rainfall, the slipperiness S of the connecting passage without the roof is increased. Therefore, the vehicle control system 10 performs the departure suppression process particularly in the connecting passage. When the management system 10M managing the parking lot PL acquires the road surface condition information 260, it is possible to execute the departure suppression process well in advance before the vehicle 1 enters the connecting passage.

What is claimed is:

1. A moving body control system installed on a moving body for controlling travel of the moving body in a predetermined area, the moving body control system comprising one or more processors configured to execute:

a position estimation process that estimates a position of the moving body based on a steering angle, a speed of the moving body, at least one marker, of a plurality of markers installed in the predetermined area, configured to be recognized by a sensor of the moving body, and map information indicating positions of roads and structures in the predetermined area and indicating a position of the at least one marker installed in the predetermined area;

a travel control process that controls travel of the moving body so as to follow a target path based on the estimated position of the moving body; and recognize an upcoming position at which a curvature of the target path is equal to or greater than a threshold value as a turning position based on the map information;

a road surface condition acquisition process configured to:

acquire a road surface condition information indicating slipperiness of a target road surface on the target path at least around the moving body;

determine whether the target road surface is in a dry condition or a wet condition based on at least one of an image of the target road surface captured by a camera, wherein the one or more processors are configured to analyze the image using artificial intelligence (AI) generated by machine learning to determine whether the target road surface is in the dry condition or the wet condition; and acquire the road surface condition information based on whether the target road surface is in the dry condition or the wet condition; and a departure suppression process includes:

dynamically changing a control parameter used in the travel control process according to the slipperiness of the target road surface such that departure of the moving body from the target path is suppressed; and changing the control parameter by correcting the target path at the turning position to a corrected target path prior to the turning position, the corrected target path is set to be on more inner side of turning as the slipperiness at the turning position becomes higher.

2. The moving body control system according to claim 1, further comprising:

the moving body control system including a moving body-side system installed on the moving body; and a management system configured to manage the predetermined area, wherein the one or more processors are distributed to the moving body-side system and the management system, and the management system is configured to execute at least the road surface condition acquisition process.

3. The moving body control system according to claim 2, wherein the road surface condition information indicates the slipperiness of the target road surface throughout the target path.

4. The moving body control system according to claim 2, wherein the moving body-side system is configured to execute the position estimation process and the travel control process, and is further configured to acquire the road surface condition information from the management system to execute the departure suppression process.

5. The moving body control system according to claim 2, wherein the management system is further configured to:

hold road surface material information indicating a material of a road surface in the predetermined area; and acquire the road surface condition information based on the road surface material information and whether the target road surface is in the dry condition or the wet condition.

6. The moving body control system according to claim 2, wherein the predetermined area is a parking lot, the moving body supports an automated valet parking in the parking lot, and the management system manages the automated valet parking in the parking lot.

7. The moving body control system according to claim 1, wherein the control parameter used in the travel control process includes a speed parameter that is the speed of the moving body or an upper limit of the speed of the moving body, and the departure suppression process includes setting the speed parameter at a position with a higher slipperiness to be lower than the speed parameter at a position with a lower slipperiness.

8. The moving body control system according to claim 7, wherein the one or more processors are further configured to recognize the turning position at which the moving body makes a turn, based on the steering angle of the moving body or the target path, and the departure suppression process includes setting the speed parameter at the turning position to be lower than the speed parameter at a position other than the turning position.

9. The moving body control system according to claim 1, wherein the control parameter used in the travel control process includes a steering speed parameter that is a steering speed of the moving body or an upper limit of the steering speed of the moving body, and the departure suppression process includes setting the steering speed parameter at a position with a higher slipperiness to be lower than the steering speed parameter at a position with a lower slipperiness.

10. A moving body control method for execution by one or more processors installed on a moving body configured for controlling travel of the moving body in a predetermined area, the moving body control method comprising:

a position estimation process for estimating a position of the moving body based on a steering angle, a speed of the moving body, at least one marker, of a plurality of markers installed in the predetermined area, configured to be recognized by a sensor of the moving body, and map information indicating positions of roads and structures in the predetermined area and indicating a position of the at least one marker installed in the predetermined area;

a travel control process that controls travel of the moving body so as to follow a target path based on the estimated position of the moving body recognizing an upcoming position at which a curvature of the target path is equal to or greater than a threshold value as a turning position based on the map information;

a road surface condition acquisition process that acquires road surface condition information indicating slipperiness of a target road surface on the target path at least around the moving body, determines whether the target road surface is in a dry condition or a wet condition based on at least one of an image of the target road surface captured by a camera, wherein the one or more processors are configured to analyze the image using artificial intelligence (AI) generated by machine learning to determine whether the target road surface is in the dry condition or the wet condition, and acquires the road surface condition information based on whether the target road surface is in the dry condition or the wet condition; and a departure suppression process that dynamically changes a control parameter used in the travel control process according to the slipperiness of the target road surface such that departure of the moving body from the target path is suppressed, changing the control parameter by correcting the target path at the turning position to a corrected target path prior to the turning position, the corrected target path is set to be on more inner side of turning as the slipperiness at the turning position becomes higher.

* * * * *